July 19, 1966 M. J. PURETIC 3,261,316
FISHING VESSEL
Filed June 10, 1964 2 Sheets-Sheet 1

INVENTOR.
MARIO J. PURETIC
BY Fulwider, Patton, Rieber,
Lee and Utecht
ATTORNEYS July 19, 1966  M. J. PURETIC  3,261,316
FISHING VESSEL
Filed June 10, 1964  2 Sheets-Sheet 2
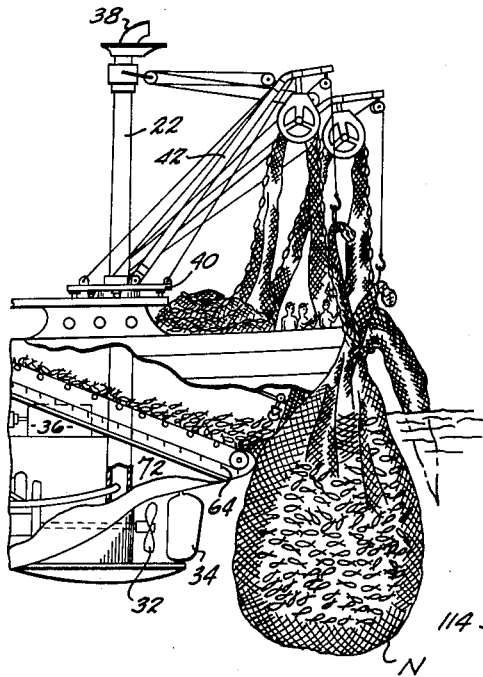
FIG 5
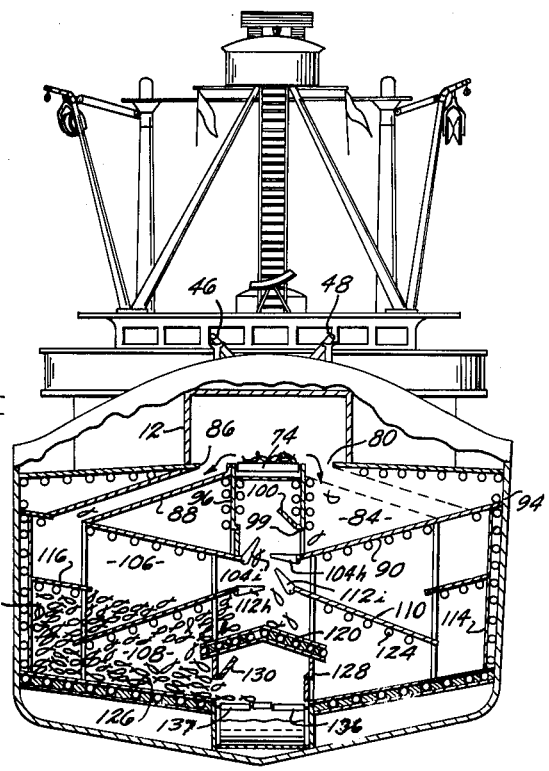
FIG. 2
FIG. 3
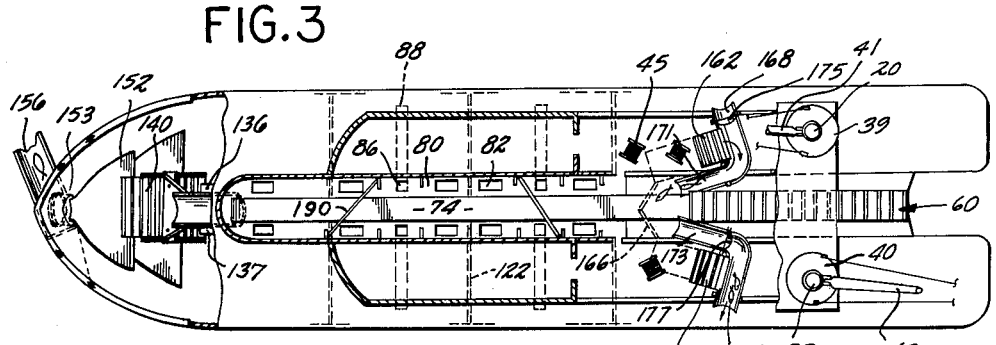
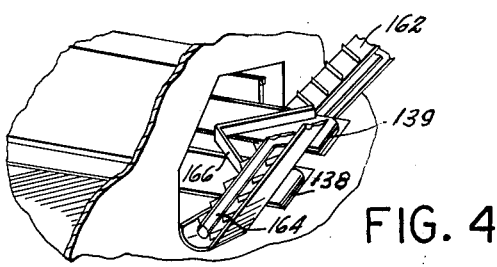
FIG. 4
INVENTOR.
MARIO J. PURETIC
BY
ATTORNEYS

United States Patent Office 3,261,316
Patented July 19, 1966

3,261,316
FISHING VESSEL
Mario J. Puretic, 901 E. 27th St.,
Long Beach, Calif. 90806
Filed June 10, 1964, Ser. No. 374,006
10 Claims. (Cl. 114—.5)

The present invention relates to a novel fishing vessel designed to provide maximum efficiency in capturing, loading, freezing, storing and subsequent unloading of fish.

It is an object of the present invention to provide a fishing vessel equipped to utilize power-driven net-handling blocks and a stern conveyor belt for capturing fish whereafter such captured fish are frozen and then transferred to a cold storage area within the vessel automatically under the influence of gravity. The fish are unloaded from such cold storage area automatically under the influence of gravity, with such fish thereafter being unloaded from the vessel by power-operated conveyor belts. The cold storage area for the fish is provided with inclined gravity walls that serve to automatically load the fish in a prearranged pattern with such gravity walls also preventing the fish from undergoing physical damage.

The purpose of this unique arrangement of the present invention in fishing operations is to develop speed, efficiency, safety and simplification for maximum results. The construction, propulsion and boat gear of the vessel of the present invention is designed in accordance with standard marine requirements and is built to accommodate the fishing function which is catching, loading, freezing, storing and unloading. Systematic techniques and series of machinery will keep pace with up-to-date and ever-improving fish processing and canning facilities and will result in better working coordination between fishing boats and receiving plants.

The vessel of the present invention is capable of discharging fish at most beaches where there are limited dock facilities or no port advantages. At such facilities a simple receiving station could be set up at an inexpensive site close to fishing grounds or labor pools.

The objects and advantages of the invention will become apparent from the following detailed description when taken in conjunction with the appended drawings wherein:

FIGURE 2 is a vertical sectional view taken along line 2—2 of FIGURE 1;

FIGURE 3 is a top plan view of said fishing vessel in reduced scale and partially broken away in section;

FIGURE 4 is a fragmentary perspective view showing aft fish-unloading conveyor belts utilized with said vessel; and FIGURE 5 is a fragmentary side elevational view showing said vessel as its net is being gathered onto the vessel's stern.

Figure 1:
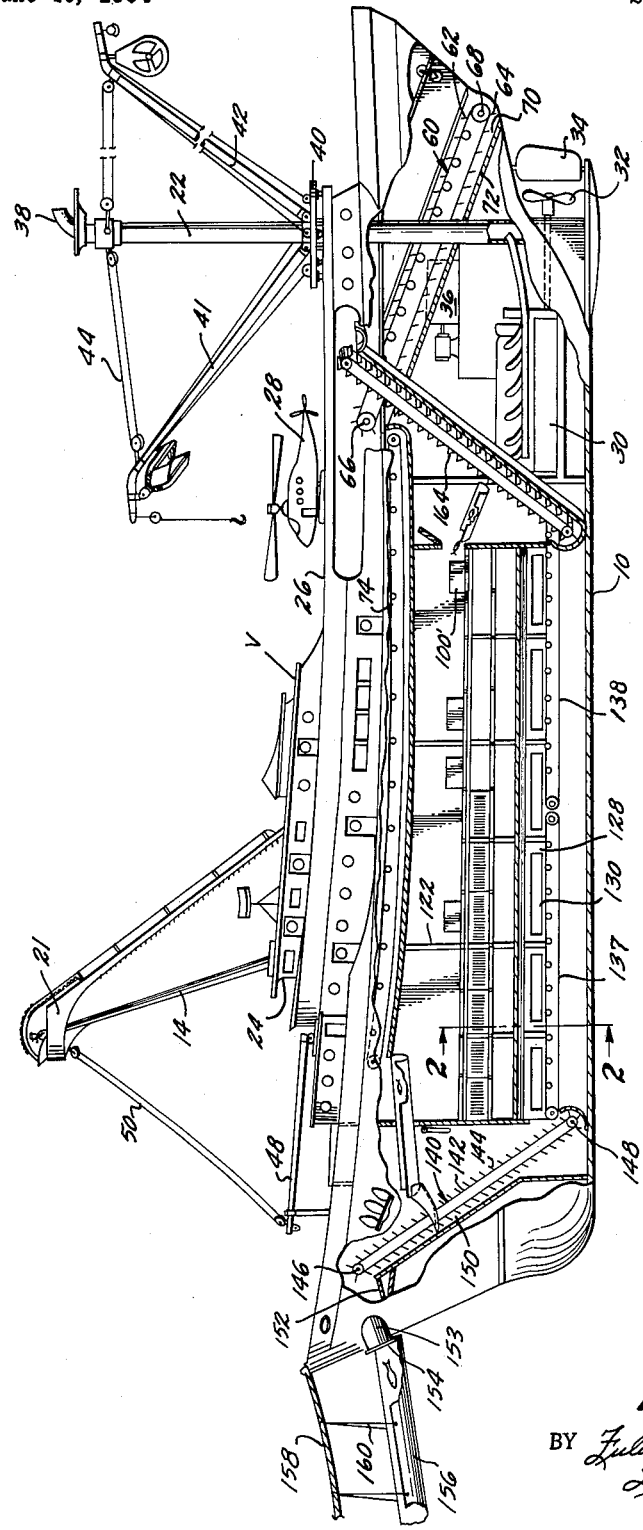
FIGURE 1 is a side elevational view taken partly in section showing a preferred form of fishing vessel embodying the present invention.

Referring to the drawings and particularly FIGURE 1 thereof, there is shown a preferred form of fishing vessel V embodying the present invention. The fishing vessel V includes a hull 10 provided with a deck house wherein are located the crew quarters, galley and storage. The hull is also provided with a forward structure 14. The hull 10 is also provided at its rear portion with a pair of transversely aligned King posts 20 and 22. A crow's nest 21 is positioned at the upper portion of the structure 14. The portion of the deck house 12 aft of the wheel house 24 may define a landing deck 26 for aircraft and small boats such as the helicopter 28 shown.

Engine room and machinery 30 are positioned within the aft portion of the hull 10 to drive one or more screws 32. A rudder 34 is mounted in a conventional manner aft of the screw means 32. Refrigeration machinery 36 is also mounted within the aft portion of the hull 10. As indicated in FIGURE 1, the exhaust pipes of the engine means 30 may discharge into one or both of the King posts 20 and 22, with the upper end of each such King posts being formed with an aft-facing stack 38.

The King posts 20 and 22 each pivotally support a turntable 39, 40 that in turn carry the lower end of a pair of stern booms designated 41 and 42, respectively. Conventional cable rigging 44 is provided to permit the free ends of the booms 41 and 42 to be raised and lowered relative to the boat. Additionally, the turntables 39 and 40 permit the booms 41 and 42 to be alternatively positioned with their free ends extending forward as indicated by the position of boom 41 in FIGURE 1 or aft as indicated by the position of the boom 42 in this figure. Each stern boom supports a power-driven block B of the type disclosed in my United States Patent Nos. 2,733,530 and 2,733,531. Slanted winches 45 are provided for pursing the net (not shown). The front of deck house 12 supports a pair of booms 46 and 48, with conventional cable rigging 50 being provided between the structure 14 and the booms to control the position of such booms.

The stern portion of the vessel V is provided with a conveyor belt unit, generally designated 60, which may be similar to the conveyor belt unit disclosed in my United States Patent No. 3,091,880. This conveyor belt unit 60 includes an endless belt member 62 preferably provided with transverse ribs 64 at longitudinally spaced points along its outer side. The belt 62 is supported between a horizontal upper roller 66 and a horizontal lower roller 68. Either the upper roller 66 or the lower roller 68 or both of such rollers may be driven in a conventional manner as by a hydraulic or electric motor.

The conveyor belt unit 60 is disposed within an upwardly and forwardly inclined tunnel 70 formed through the transom of the hull 10. The lower extremity of the tunnel 70 is defined by a bottom wall 72 that extends forwardly and upwardly relative to the vessel's hull 10. As indicated in FIG. 1, the forward portion of the tunnel base wall 72 and the stern conveyor belt unit 60 overhangs the aft end of a longitudinally extending fish-distributing conveyor belt 74 disposed at the center-line of the vessel's hull 10. The conveyor belt 74 is adapted to receive fish from the upper end of the stern conveyor belt 60 and transport such fish forwardly through the upper interior portion of the hull 10.

The conveyor belt 74 moves along the mid-portion of a fish-receiving deck 80 disposed within the deck house 12. This fish-receiving deck 80 is provided with a plurality of openings 82 that permit access to a plurality of longitudinally spaced quick freezing compartments 84 located below the fish-receiving deck 80. The fish-receiving deck 80 is also provided with a second plurality of openings 86 that permit access to a plurality of longitudinally spaced topping gravity tubes 88.

The quick freezing compartments 84 are refrigerated in a conventional manner whereby fish dropped thereinto through the openings 82 will be frozen in a short period of time. These compartments are seen to extend outwardly from either side of the fish-loading conveyor belt 74, and each compartment 84 includes a lower, downwardly and inwardly inclined wall 90, an upper wall 92, an outboard wall 94 which may be defined by the skin of the vessel's hull 10 and an inboard generally vertically extending wall 96. The latter wall 96 is in general alignment with an edge of the fish-loading conveyor belt 74. Referring to FIG. 2, it should be particularly noted that the lowermost portion of each inboard wall 96 is provided with a pair of discharge apertures 99 normally closed by gate 100 having its upper portion hingedly connected to the wall 96. Each gate 100 opens upwardly from a normal position depicted by the left-hand gate 100 in FIG. 2 to an open position depicted by the right-hand gate 100 in FIG. 2. When urged to an open position, the gates 100 permit frozen fish to be released from the quick freezing compartments 84. It should be understood that if brine solution is used, it will have to be withdrawn from such compartment 84 prior to the time that the fish are released therefrom. An important feature of the present invention is the provision of the downwardly and inwardly sloping lower walls 90 which permit the frozen fish to drop out of the freezing compartment 84 under the influence of gravity.

With further reference to FIG. 2, the frozen fish released from the discharge apertures 99 of the freezing compartments 84 will move over deflector plates 104. Each deflector plate 104 has its outboard edge pivotally secured to the inboard extremity of the lower wall 90 of the freezing compartment 84 whereby such plate may be either positioned horizontally, as indicated by reference numeral 104h in FIG. 2, or at an inclined angle, as indicated by the reference numeral 104i in FIG. 2.

Each freezing compartment 84 discharges frozen fish into an upper storage compartment 106 disposed immediately below its respective freezing compartment, as shown in FIG. 2. Positioned below each upper storage compartment is a lower storage compartment 108. Each of the upper and lower storage compartments are separated by an outwardly and downwardly inclined intermediate deflector wall 110. The upper edge of each such deflector wall 110 is provided with a deflector plate 112 similar to the aforedescribed deflector plates 104. The deflector plates 112 may either be positioned horizontally as indicated by reference numeral 112h in FIG. 2, or at an inclined angle as indicated by reference numeral 112i in FIG. 2. With continued reference to this latter figure, it will be observed that the outboard edges of the deflector walls 110 terminate inwardly of the common outer walls 114 of the upper and lower storage compartments. An upper outwardly and downwardly extending deflector wall 116 is positioned at the outer portion of each side of the upper storage compartment 106. The inboard edge of such upper deflector walls 116 overly the outboard edges of the aforementioned intermediate deflector walls 110. A lower deflector wall 120 of inverted generally V-shaped configuration is positioned at the mid-portion of the lower storage chamber compartment 108, with its apex arranged on the center line of the vessel's hull 10.

It should be understood that the various freezing compartments 84 and their corresponding upper and lower storage compartments 106 and 108 may be separated by means of suitable bulkheads 122. It should be further understood that conventional refrigeration coils 124 are provided for cooling the freezing compartments 84 and the upper and lower storage compartments. A number of such coils 124 may be arranged at the underside of the walls 90, 110, 116 and 120. Such coils may also be arranged outwardly of the outboard walls 114, and downwardly of the lower walls 126 of the storage compartments. Suitable insulation will be provided for the exterior walls of all refrigerated area and the hull 10 of the vessel in accordance with conventional refrigeration practice. The storage compartments 106 and 108 will preferably provide dry storage for the frozen fish.

Referring again to FIGURE 2, and with additional reference to FIGS. 1 and 2, the inboard walls 128 of the lower storage compartment 108 are provided with one or more discharge apertures 130. Each discharge aperture 130 is normally closed by a gate 132 having its upper edge hingedly connected to its respective inboard wall 128 above aperture 130. Each gate 132 opens upwardly from a normal vertical position to an open position depicted in dotted outline in this FIGURE 2. When urged to an open position the gates 132 permit fish to be released from the lower storage compartment 108.

Two pairs of transversely aligned fish-unloading conveyor belts 136, 137 and 138, 139 are provided to unload the fish from the lower storage compartment 108. The forward pair of unloading conveyor belts 136 and 138 transfer fish from the forward storage compartments 108 forwardly toward a bow conveyor belt unit, generally designated 140. The bow conveyor belt unit 140 includes an endless belt member 142 preferably provided with transverse ribs 144 at longitudinally spaced points along its outer side. The belt 140 is supported between a horizontal upper roller 146 and a horizontal lower roller 148. Either of these rollers or both may be power driven in a conventional manner as by a hydraulic or electric motor. The bow conveyor belt unit 140 is disposed within an upwardly and forwardly inclined tunnel 150 that extends along the center line of the vessel V.

The upper end of the bow conveyor belt 140 is disposed just aft of a forwardly tapered downwardly inclined fish-unloading hopper 152. The hopper 152 is inclined downwardly and forwardly so as to dump fish into the rear end of a tube 153 that extends through the vessel's bow stem and is provided at its forward end with a fish discharge opening 154. A fish-unloading chute 156 is adapted to receive fish from the fish discharge opening of the tube 153 and to transfer such fish to an unloading point. The chute 156 is shown depending from a line 158 that extends from the bow of the vessel V to an unloading point, a plurality of slings 160 connecting the chute 156 with the line 158.

The rear pair of unloading conveyor belts 138 and 139 transfer fish from the aft lower storage compartments 108 towards a pair of aft unloading conveyor belts 162 and 164. The construction of the belts 162 and 164 are generally similar to the construction of the bow unloading conveyor belt 140. These aft unloading conveyor belts 162 and 164 extend rearwardly, upwardly and outwardly relative to the center line of the vessel V, with their lower edges disposed below the elevation of the rear of the aft conveyor belts 138 and 139 whereby fish from these conveyor belts will be freely movable onto the lower ends of said aft unloading conveyor belts. With particular reference to FIGURE 4, it should be noted that a horizontal generally V-shaped guide 166 is provided to deflect fish from the aft conveyor belts 138 and 139 outwardly onto the lower portion of the aft unloading conveyor belts 162 and 164. The upper ends of the aft unloading conveyor belts 162 and 164 transfer fish onto a pair of outwardly extending elbowed chutes 168 and 170, respectively. The outer ends of these elbowed chutes may be connected with suitable unloading chutes similar to aforedescribed chute 156. The inner ends of these chutes 168 and 170 are connected to a pair of inwardly and downwardly extending return chutes 171 and 173 for a purpose to be set forth hereinafter. Blocking gates 175 and 177 are provided for the chutes 168 and 170.

Referring to FIGURE 5, in the operation of the aforedescribed vessel V, a conventional fish net N is gathered towards the stern of the vessel by means of the power blocks B mounted on the stern booms 41 and 42 and the fish within the net are then transferred onto the lower end of the stern conveyor unit 60. The fish from the net N are moved upwardly and forwardly by means of the conveyor belt 62 onto the aft end of the fish distributing conveyor belt 74. Fish dropped onto the aft end of the latter conveyor belt are moved forwardly along the midportion of the fish-receiving deck 80. Fish from the belt 74 are deflected into the openings 82 of the freezing compartments 84 by means of portable guide plates 190 which may be removably disposed along the fish-receiving deck 80 at an angle thereto, in the manner shown in dotted outline in FIGURE 2. It will be understood that the fish may be quick-frozen within the freezing compartments 84 in a conventional manner.

Referring now particularly to FIGURE 2 and assuming the lowermost storage chamber is initially empty, after the fish deposited therein are frozen, if brine is used it will be removed from the right-hand freezing chamber 84 shown in this figure. Thereafter, the gate 100 will be opened. At this time the right-hand deflector plate 104*h* will be arranged in a horizontal position. Frozen fish from the right-hand freezing compartment 84 will slide downwardly out of this freezing compartment through the discharge apertures 99 over the deflector plate 104*h* and towards the upper portion of the left-hand intermediate deflecting wall 110, all as indicated in FIG. 2. Deflector plate 104*i* is, of course, arranged at an angular position to permit such movement of fish. The fish will then slide downwardly over the left-hand intermediate deflector wall 110 and off the outboard edge thereof so as to enter the left-hand portion of the lower storage compartment 108. The fish will then slide downwardly along the lower wall 126 of the left-hand portion of the lower storage chamber 108 so as to come to rest against the inboard wall 128 of this chamber. It should be particularly noted that the aforedescribed movement of fish out of the freezing compartment 84 and into the lower storage compartment 108 takes place under the influence of gravity because of the provision of the slanted gravity walls 90, 110 and 126.

After the frozen fish have filled the right-hand portion of the lower storage chamber 108 to approximately the elevation of the lower edge of the intermediate deflector wall 110, the fish will begin filling the left-hand portion of the upper storage chamber 106. When the frozen fish have filled the left-hand portion of the upper storage chamber 106 to approximately the elevation of the inboard edge of the upper deflector wall 116, the deflector 112*h* connected to the inboard edge of the left-hand intermediate deflector wall 110 will be raised. Thereafter, frozen fish moving downwardly from the inboard edge of the deflector plate 104*h* will drop onto the left-hand leg of the lower deflector wall 120 so as to fill the upper right-hand portion of the lower storage chamber 108. The upper left-hand portion of the upper storage chamber 106 will be filled by means of the fish-topping tubes 88, as indicated particularly in FIGURE 2.

Frozen fish for such topping purposes may be obtained from one of the aft freezing compartments. Thus, as indicated in dotted outline in FIGURE 1, a portable gravity chute 192 may be used to transfer frozen fish from gate 100′ to one of the aft unloading conveyor belts 162 in the manner shown in FIGURE 3. The latter will elevate such fish for subsequent transfer to the elbowed chute 168. Blocking gate 175 is positioned at the outer portion of chute 168 whereby fish dumped into this chute will be caused to slide downwardly and forwardly through chute 173 to the aft end of conveyor belt 74. This belt will move the fish forwardly to be deflected into the fish topping tube openings 86 by means of guide plates 196 which may be removably disposed along the fish-receiving deck 80 at an angle thereto, in the manner shown in dotted outline in FIGURE 2.

The above-described sequence of steps will be followed in order to fill the other upper and lower storage chambers 106 and 108 from the other freezing compartments 84. It is important to observe that since the fish-receiving deck 80 and its openings 82 and 86 are within the protective confines of the deck house 12, the vessel's personnel are protected from the elements during adverse weather conditions. Also, waves breaking over the vessel will not enter these openings.

When the fish are to be unloaded from the vessel V, the fish-unloading conveyor belts 136, 137, 138 and 139 will be actuated. The gates 132 will then be opened whereby fish will be discharged through the apertures 130 onto the unloading conveyor belts under the influence of gravity. Fish discharged onto the forward conveyor belts 136 and 138 will be transferred onto the bow conveyor belt 140. Similarly, fish which drop onto the aft conveyor belts 138 and 139 will be transferred into the aft unloading conveyor belts 162 and 164. At this time blocking gates 177 will be positioned in elbowed chutes 168 and 170 whereby fish dumped into these chutes by belts 162 and 164 will move outwardly onto suitable unloading chutes (not shown). Suitable controls will be provided for the four unloading conveyor belts so as to permit their individual start and stop actuation.

It should be particularly noted that the unloading of the fish from the storage compartments 106 and 108 will take place under the influence of gravity, such fish sliding over the various gravity walls 90, 110, 116, 120 and 126. Although it may be necessary to occasionally manually direct the fish by means of a pushing and pulling stick, it will not be necessary for personnel to lift the fish at any time. In this manner considerable reduction in the labor of loading and unloading fish is afforded, as well as an increase in labor efficiency and corresponding savings of time. It should be further noted that the deflector walls 110, 116 and 120 serve as fish-supporting racks which prevent the tight packing of fish as well as preventing the fish from shifting in rough seas. In this manner physical damage to the fish is avoided. The aforedescribed arrangement also permits spacing of refrigeration coils 124 within the storage chambers 106, 108 in an efficient manner without requiring extra structure. The provision of these aforementioned deflector walls likewise insures that the frozen fish will not have to be dropped through such a height as to undergo physical damage. It will also be apparent that these deflector walls support the weight of the fish disposed thereabove with respect to the fish disposed therebelow. This is an important feature in avoiding damage to the loaded fish. It should also be observed that the positioning of the vessel's propulsion and refrigeration machinery within the lower aft portion of the hull 10 provides a clean unobstructed area forward of such machinery, such area being utilized for freezing and storing the fish. The use of a single large refrigerated storage area as compared to the usual arrangement wherein several small refrigerated areas are utilized permits a reduction in the load imposed upon the refrigeration equipment.

The provision of the unloading chute 156 makes it possible to easily discharge fish even where limited dock facilities exist. This is accomplished by anchoring the vessel V as near shore as possible and running the chute 156 to a fish-unloading point on the shore. The two chutes 168 and 170 could also deposit fish onto smaller boats for transfer to shore. It should be particularly noted that the overhanging twin transom construction provides a pair of safe working platforms 196 and 197 for the crew of the fishing vessel from which the netted fish may be urged out of the net and onto the lower portion of the stern conveyor unit 60. This is an important safety feature in rough weather because it eliminates the need of a skiff. In discharging fish from the net N, the power-driven blocks B retrieve the net lengthwise from each end to the middle. The remaining depth is then shallowed and progressively stacked on the working platforms 196 and 197, all without exposing the crew to danger in a manner similar to that disclosed in my United States Patent No. 3,091,880.

Various modifications and changes may be made with respect to the foregoing detailed description without departing from the spirit of the present invention or the scope of the following claims.

I claim:
1. In a fishing vessel, the combination of:
  loading means for removing fish from a net that is disposed adjacent said vessel;
  a fish-receiving deck, said deck being formed with openings;
  fish-distributing conveyor means that receive fish from said loading means and moves said fish along said fish-receiving deck;

fish-freezing means accessible from said fish-receiving deck by means of said openings and having downwardly and inwardly inclined lower walls;
adjustable guide plates on said deck to deflect said fish into said openings;
a refrigerated storage compartment below said freezing means that receives frozen fish from said freezing means under the influence of gravity, said storage compartment having downwardly and inwardly inclined lower walls;
power-operated fish-unloading conveyor means that receive fish from said storage compartment under the influence of gravity;
and upwardly inclined conveyor belts that receive fish from said fish-unloading conveyor means and move said fish upwardly out of the confines of said vessel.

2. In a fishing vessel, the combination of:
stern conveyor means for removing fish from a net that is disposed adjacent the stern of said vessel;
a fish-receiving deck extending forwardly of said stern conveyor means, said deck being formed with openings along its length;
fish-distributing conveyor means that receive fish from said loading means and moves said fish along said fish-receiving deck;
fish-freezing means accessible from said fish-receiving deck by means of said openings and having downwardly and inwardly inclined lower walls;
adjustable guide plates on said deck to deflect said fish into said openings;
a refrigerated storage compartment below said freezing means that receives frozen fish from said freezing means under the influence of gravity, said storage compartment having downwardly and inwardly inclined lower walls;
power-operated fish-unloading conveyor means that receive fish from said storage compartment under the influence of gravity;
and upwardly inclined conveyor belts that receive fish from said fish-unloading conveyor means and move said fish upwardly out of the confines of said vessel.

3. In a fishing vessel, the combination of:
a fish-receiving deck formed with first and second openings;
fish-distributing conveyor means that receive fish from said loading means and moves said fish along said fish-receiving deck;
fish-freezing means accessible from said deck by means of said first openings;
a storage compartment below said fish-freezing means that receives fish therefrom;
fish topping tubes extending downwardly from said second opening into said storage chamber;
power-operated fish-unloading conveyor means that receive fish from said storage compartment under the influence of gravity;
upwardly inclined conveyor belts that receive fish from said fish-unloading conveyor means and move said fish upwardly out of the confines of said vessel;
and chute means connecting said fish-freezing means to one of said upwardly inclined conveyor belts and the latter to said fish-receiving deck for topping said storage compartment with frozen fish.

4. In a fishing vessel, the combination of:
a fish-receiving deck formed with first and second openings;
fish-distributing conveyor means that receive fish from said loading means and moves said fish along said fish-receiving deck;
fish-freezing means accessible from said deck by means of said first openings;
a storage compartment below said fish-freezing means that receives fish therefrom;
fish topping tubes extending downwardly from said second opening into said storage chamber;
power-operated fish-unloading conveyor means that receive fish from said storage compartment under the influence of gravity;
upwardly inclined conveyor belts that receive fish from said fish-unloading conveyor means and move said fish upwardly out of the confines of said vessel;
chute means connecting said fish-freezing means to one of said upwardly inclined conveyor belts and the latter to said fish-receiving deck for topping said storage compartment with frozen fish;
and adjustable guide plates on said deck to deflect said fish into said openings.

5. In a fishing vessel, the combination of:
stern conveyor means for removing fish from a net that is disposed adjacent the stern of said vessel;
a fish-receiving deck extending forwardly of said stern conveyor means, said deck being formed with first and second openings along its length;
fish-distributing conveyor means that receive fish from said loading means and moves said fish along said fish-receiving deck;
fish-freezing means accessible from said deck by means of said first openings;
a storage compartment below said fish-freezing means that receives fish therefrom;
fish topping tubes extending downwardly from said second openings into said storage chamber;
power-operated fish-unloading conveyor means that receive fish from said storage compartment under the influence of gravity;
upwardly inclined conveyor belts that receive fish from said fish-unloading conveyor means and move said fish upwardly out of the confines of said vessel;
and chute means connecting said fish-freezing means to one of said upwardly inclined conveyor belts and the latter to said fish-receiving deck for topping said storage compartments with frozen fish.

6. In a fishing vessel, the combination of:
stern conveyor means for removing fish from a net that is disposed adjacent the stern of said vessel;
a fish-receiving deck extending forwardly of said stern conveyor means, said deck being formed with first and second openings along its length;
fish-distributing conveyor means that receive fish from said loading means and moves said fish along said fish-receiving deck;
fish-freezing means accessible from said deck by means of said first openings;
a storage compartment below said fish-freezing means that receives fish therefrom;
fish topping tubes extending downwardly from said second opening into said storage chamber;
power-operated fish-unloading conveyor means that receive fish from said storage compartment under the influence of gravity;
upwardly inclined conveyor belts that receive fish from said fish-unloading conveyor means and move said fish upwardly out of the confines of said vessel;
chute means connecting said fish-freezing means to one of said upwardly inclined conveyor belts and the latter to said fish-receiving deck for topping said storage compartment with frozen fish;
and adjustable guide plates on said deck to deflect said fish into said openings.

7. In a fishing vessel, the combination of:
loading means for removing fish from a net that is disposed adjacent said vessel;
a fish-receiving deck formed with openings along its length;
fish-distributing conveyor means that receive fish from said loading means and moves said fish along said fish-receiving deck;
fish-freezing means accessible from said fish-receiving deck by means of said openings formed in said deck;

a fish storage compartment below said fish-freezing means that receives frozen fish from said fish-freezing means;

horizontal, longitudinally extending conveyor belt means below said compartment that receive fish from said compartment;

upwardly inclined conveyor belt means in the bow of said vessel that receive fish from the forward end of said horizontal conveyor belt means and moves said fish out of the confines of said vessel;

and upwardly inclined conveyor belt means adjacent the aft end of said horizontal conveyor belt means that receive fish from the aft end of said horizontal conveyor belt means and moves said fish out of the confines of said vessel.

8. In a fishing vessel, the combination of:

stern conveyor means for removing fish from a net that is disposed adjacent the stern of said vessel;

a fish-receiving deck formed with openings along its length;

fish-distributing conveyor means that receive fish from said stern conveyor means and moves said fish along said fish-receiving deck;

fish-freezing means below said fish-receiving deck and accessible therefrom by means of said openings formed in said deck;

a fish storage compartment below said fish-freezing means that receives frozen fish from said fish-freezing means;

horizontal, longitudinally extending conveyor belt means below said compartment that receive fish from said compartment;

upwardly inclined conveyor belt means in the bow of said vessel that receive fish from the forward end of said horizontal conveyor belt means and moves said fish out of the confines of said vessel;

and upwardly inclined conveyor belt means adjacent the aft end of said horizontal conveyor belt means that receive fish from the aft end of said horizontal conveyor belt means and moves said fish out of the confines of said vessel.

9. In a fishing vessel, the combination of:

loading means for removing fish from a net that is disposed adjacent said vessel;

a fish-receiving deck formed with openings along its length;

fish-distributing conveyor means that receive fish from said loading means and moves said fish along said fish-receiving deck;

fish-freezing means accessible from said fish-receiving deck by means of said openings formed in said deck;

a fish storage compartment;

horizontal, longitudinally extending conveyor belt means below said compartment that receive fish from said compartment;

upwardly inclined conveyor belt means in the bow of said vessel that receive fish from the forward end of said horizontal conveyor belt means and moves said fish out of the confines of said vessel;

upwardly inclined conveyor belt means adjacent the aft end of said horizontal conveyor belt means that receive fish from the aft end of said horizontal conveyor belt means and moves said fish out of the confines of said vessel;

and chute means extending away from said vessel that receive fish from said upwardly inclined conveyor belt means and transfers said fish from said vessel.

10. In a fishing vessel for use with a net, the combination of:

an upwardly and forwardly inclined stern conveyor belt;

a pair of working platforms on the stern portion of said vessel disposed at the opposite sides of said stern conveyor belt;

a derrick disposed forward of each of said working platforms;

a power-driven block supported by each of said derricks to engage said net and dump fish contained therein onto said conveyor belts, with said net thereafter being progressively stacked onto said working platforms;

fish-distributing conveyor means that receive fish from said working platforms and moves said fish along said vessel;

fish-freezing means accessible from said fish-distributing conveyor means;

a fish storage compartment below said fish-freezing means that receives frozen fish from said fish-freezing means;

horizontal, longitudinally extending conveyor belt means below said compartment that receive fish from said compartment;

upwardly inclined conveyor belt means in the bow of said vessel that receive fish from the forward end of said horizontal conveyor belt means and moves said fish out of the confines of said vessel;

and upwardly inclined conveyor belt means adjacent the aft end of said horizontal conveyor belt means that receive fish from the aft end of said horizontal conveyor belt means and moves said fish out of the confines of said vessel.

References Cited by the Examiner

UNITED STATES PATENTS

| | | | |
|---|---|---|---|
| 2,413,918 | 1/1947 | Harris | 114—0.5 |
| 2,532,249 | 11/1950 | Ward | 214—15 |
| 3,009,586 | 11/1961 | Isbrandtsen et al. | 214—15 |
| 3,091,880 | 6/1963 | Puretic | 43—8 |

FOREIGN PATENTS 752,731   7/1956   Great Britain.

FERGUS S. MIDDLETON, *Primary Examiner.*

MILTON BUCHLER, *Examiner.*

T. M. BLIX, *Assistant Examiner.*